United States Patent [19]
Chamings et al.

[11] Patent Number: 5,839,174
[45] Date of Patent: Nov. 24, 1998

[54] SEAT BELT BUCKLE

[75] Inventors: Tony Chamings, Royal Oak; Rudi Grzic, Sterling Heights, both of Mich.; Harjeet Gill, Windsor, Canada

[73] Assignee: Breed Automotive Technology, Inc., Lakeland, Fla.

[21] Appl. No.: 874,998

[22] Filed: Jun. 13, 1997

[51] Int. Cl.$^6$ .................................................. A44B 11/26
[52] U.S. Cl. ............................................. 24/633; 24/642
[58] Field of Search ...................... 24/303, 633, 636–642

[56] References Cited

U.S. PATENT DOCUMENTS 4,943,087   7/1990   Sasaki .
5,218,744   6/1993   Saito ...................................... 24/633 X
5,233,732   8/1993   Yamanishi ................................. 24/303

*Primary Examiner*—James R. Brittain
*Attorney, Agent, or Firm*—Markell Seitzman

[57] ABSTRACT

A seat belt buckle (100) comprising: a frame (102) having a tongue receiving opening (170) to receive a tongue (173) as the tongue is moved in a first direction, a latch member (180) arranged to move from a latched position to an unlatched position, an ejector to eject the tongue which the latch member is in its unlatched position, an electronic sensor assembly (400) located upon the frame (102) comprising a magnetic sensor and a spaced magnet, a metal bar (260) supported on one of the latch member (180), the ejector (131) or a pivot member (500) and movable into position between the sensor and the magnet.

6 Claims, 6 Drawing Sheets

SEAT BELT BUCKLE

BACKGROUND AND SUMMARY OF THE INVENTION

The present invention generally relates to buckles for seat belts and more particularly to buckles incorporating a usage indication switch.

Seat belt buckles particularly those employed in the front seating positions of a vehicle often use electric or electro-mechanical switches to provide an indication that the occupant has buckled the seat belt about him or herself. The electro-mechanical type of switch often includes two conductive members that are moved apart (to open an electric circuit) by a non-conductive member in response the insertion of the tongue into the buckle. This non-conductive member is typically attached to a spring loaded ejector of the buckle. Consequently, this type of switch does not provide a direct indication of the locked/unlocked state of the buckle. The electronic type of buckle switch might use a magnetic sensor such as a Hall Effect sensor and magnet, the magnetic field therebetween being interrupted by a conductive member. This type of switch has fewer moving parts and may be more reliable than the electromechanical type of switch.

In the present invention the electronic switch is positioned to provide an effective indication that the latch plate (or locking mechanism) of the buckle has moved from its released (unlatched or unlocked) position to its locked (latched) position.

An object of the present invention is to provide an improved seat belt buckle.

Accordingly, the invention comprises: a seat belt buckle comprising: a frame defining a tongue receiving opening to receive a tongue as the tongue moved into the buckle in a first direction, the frame also has a first opening therein, and opposing frame sides, each side includes a latch plate slot, arranged generally perpendicular to the first direction, a latch plate having end or wing portion is slidably movable within the latch plate slots between an unlatched position and a locked position. In the latched position the latch plate is in engagement with an opening in the tongue and also positioned within the first opening in the frame. The buckle further includes a sensor assembly to provide an indication that the latch plate has moved into its latched position within the tongue. In one embodiment of the invention a sensor assembly comprising a Hall Effect sensor and closely spaced magnet is used wherein the magnetic field is interrupted by a metal bar movable with the ejector of the buckle. In another embodiment, the sensor assembly is positioned adjacent the latch plate wherein the metal bar is attached to and movable with the latch plate into the space between the sensor and the magnet. In another embodiment the sensor assembly is positioned remotely from the latch plate and a pivoted member is used to moved the bar into position between the sensor and magnet. This pivoted member may include one arm that rides upon and moves with the latch plate and an opposite part which moves the conductive member (bar) into and away from the gap or space in the sensor assembly.

Many other objects and purposes of the invention will be clear from the following detailed description of the drawings.

DETAILED DESCRIPTION OF THE DRAWINGS

Figure 1:
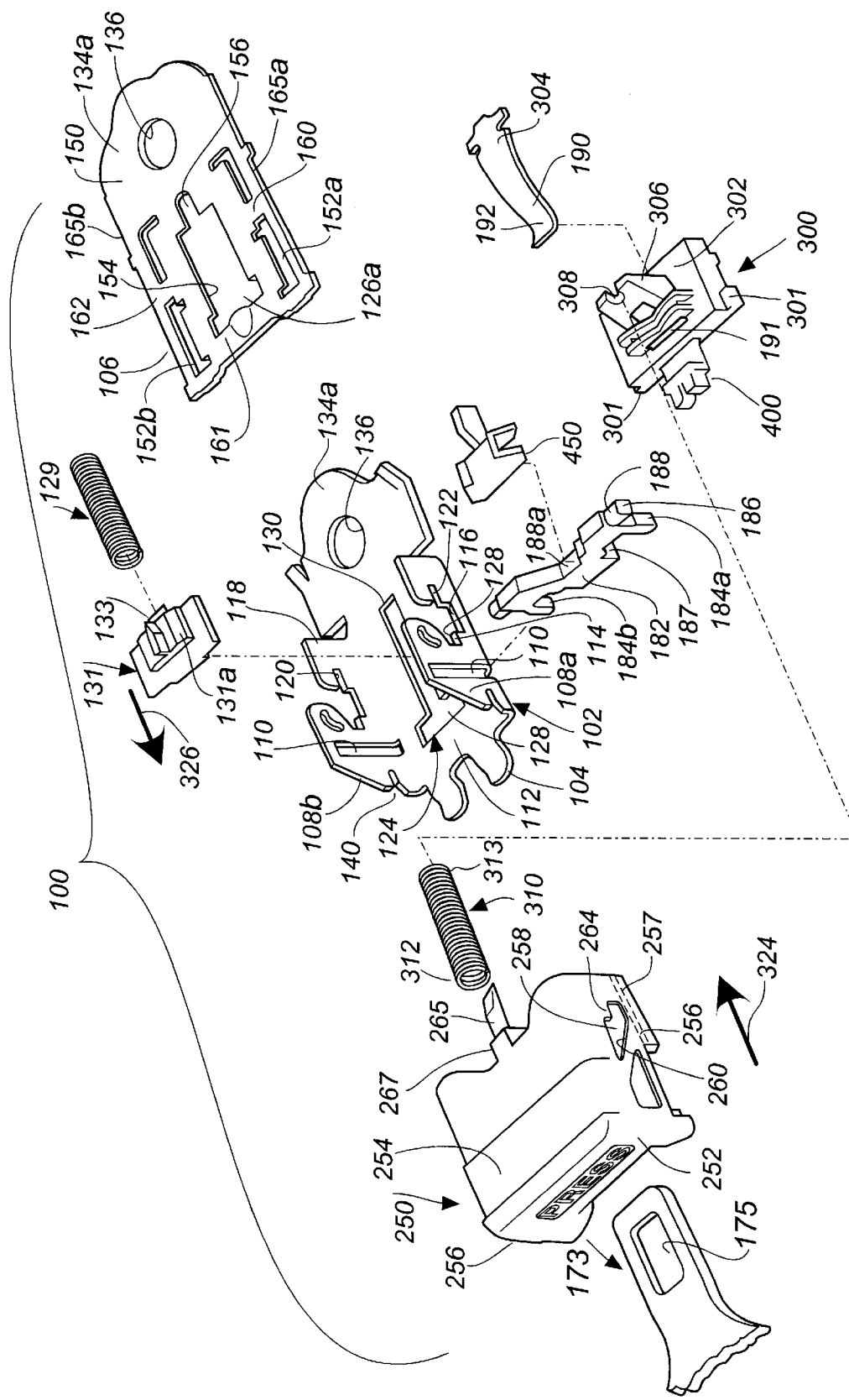
FIG. 1 is an assembly view showing many of the major elements of a first embodiment of the present invention.

The present invention is usable with a variety of differently constructed seat belt buckles. The present invention incorporates into a seat belt buckle 100 a magnetic sensor assembly 400 and a movable metal sensor element 460 which interacts and changes the magnetic field of the sensor assembly to generate a signal indicating that a latching member 180 of the buckle 100 and cooperating tongue 173 have been properly latched together.

Most if not all seat belt buckles, such as buckle 100 will include a frame 102 defining a tongue receiving slot 170 and an ejector 131, operatively located in or near the slot 170 and slidably situated within the frame. The ejector 131 is spring loaded by an ejection spring 129. The ejector 131 is pushed inwardly by the tongue, upon insertion of the tongue into the buckle, typically uncovering slots 126, 126a through which the latching member can move into as it attains its locked or latched position. The ejector 131 pushes the tongue out of the buckle after the latching member 180 is moved to its unlatched position. This action is typically initiated when a manually actuated push button 250 is depressed. When in the latched condition, the latching member 180 extends through an opening (slots) in the frame, previously uncovered as the ejector is moved by the tongue, to lockingly engage a receiving slot 175 in the tongue. While in the illustrated embodiments the locking member 180 is shown as a linearly movable latch plate 180, it should be appreciated that a rotary latching member is also within the scope of the present invention. The latch plate 180 is biased (into the frame) towards its latched position by a spring 190 such as a leaf spring that is supported in a spring housing 300. The spring housing 300 is also supported upon an upper portion of the frame 102. In the embodiments below, the spring housing 300 also functions as a housing for the sensor assembly 400, as such, the terms spring housing and spring/sensor housing are used interchangeably.

With reference to FIG. 1 the buckle 100 includes a frame 102 having a lower frame part 104 and an upper frame part 106. The frame parts may be of integral construction or formed from two separate parts that are mated together as shown in the figures.

The lower frame part 104 includes two sides 108a,b which extend upwardly from a plate portion 112. Each side 108a,b includes a vertical (latch late) slot 110, which serves as a guide for a vertically movable latch plate 180. The frame sides 108a,b additionally include a first ledge 114 and a cutout or groove 116. Situated in a rear side end 118, of the lower frame part 104, is a slot 120 which defines a second ledge 122. The lower frame part 104 further includes a T-shaped slot 124 having a cross-slot 126 and an extending portion 128 which terminates at an end 130. The lower frame part 104 includes an end piece 134a having an optional mounting opening 136 in which a strap or cable is secured. The front of each side 108a,b includes a slot 140 which receives and aligns the lower frame part 104 to the upper frame part 106.

The upper frame part 106 (as shown in FIG. 1) is formed from a thin flat plate 150 having a set of spaced openings 152a,b, a central opening 154 having a narrow extending slot 156 and cross-slot 126b. When the frame parts 104 and 106 are assembled together, slots 126 and 126a and slots 156 and 128 are respectively aligned. Slots 156 and 128 function as a guide for a mating portion of the ejector 131 and also house the ejector spring 129. The upper frame part 106 also includes an end piece 134a having an opening 136 of the same or similar size as opening 136 in the lower frame part 104. When the frame parts 104 and 106 are attached these openings 136 overlay one another. The assembly of the lower and upper frame parts is rather conventional and is known in the art. The front ends of slots 152a,b of the upper frame part 106 are received within the slots 140 on the front of the sides 108a,b and the upper frame part 106 is then rotated downward so that the sides 108a,b (of the lower frame part 104) extend through the slots 152a,b. The upper frame part 106 is laid flat on the lower frame part 104 with medial portions 160 and 162 resting upon the top of the opposing slot or groove 116 in each side of the lower frame part. The front 161 of the upper frame part 106 is bent upwardly (see FIG. 2) so that when in place on the frame parts cooperate to define a slot 170 through which a tongue 173 is received (see FIG. 2). The sides 165a,b of the upper frame plate 106 extend outwardly over the corresponding sides of the lower frame part 104 and are received in corresponding grooves 257 in a button 250 and serve to guide the button along the sides of the frame 102 as the button is moved.

The ejector 131 is generally rectangular shaped and is positioned within the space 170 between the frame parts 104 and 106 and is guided fore and aft by the frame as it slides in the slots 128 and 154. The ejector 131 may include an extending boss 131a that is received in slot 154 and a boss portion 131b that slides in slot 128. The ejector further includes an end boss 133 to receive one end of the ejector spring 129. The ejector spring 129 is loosely positioned between the upper and lower frame parts and against slot end 130.

The latch plate 180 includes a center latch portion 182 and two side legs 184a,b. The center latch portion 182 is movable into the slots 126, 126a (in the lower and upper frame parts) and within a latch receiving opening 175 of the tongue 173 (when in a locked position). The two side legs 184a,b are slidably received and guided in the respective opposing frame slots 110. The latch 180 further includes two extending wings 186. The tip 187 of the central latch portion 182 may be flat (as illustrated) or chamfered. The latch plate 180 further includes a stepped top 188 having a center portion 188a.

The buckle further includes a spring housing 300 with a leaf spring 190 extending through a slot 191 formed therein. The leaf spring 190 acts upon the top center portion 188a of the latch plate to bias the latch plate 180 downwardly into the slots 126, 126a in the frame parts toward its latched position. The spring housing 300 includes a body 302 and is received upon the top of the upper frame part 106 and includes projections 301 received in and secured into the slots 120 formed in the lower frame part 104. This spring housing 300 is shown in greater detail in the other figures. One end 304 of the leaf spring 190 is received in slot 191 in the body 302 and the other end 192 of the leaf spring 190 is positioned to exert a force to the top of the latch 180. The body 302 also includes a riser 306 having a semi-circular guide 308. A helical bias spring 310 is received about a button pin 265. One end 312 of the spring 310 is received upon a boss 267 of the button 250 and an opposite end 313 of the spring 310 presses against the riser 306. This spring 310 serves to bias the button 250 outwardly relative to the frame parts 104 and 106 and resists inward movement of the button 250 as it is depressed by the occupant.

Figure 3:
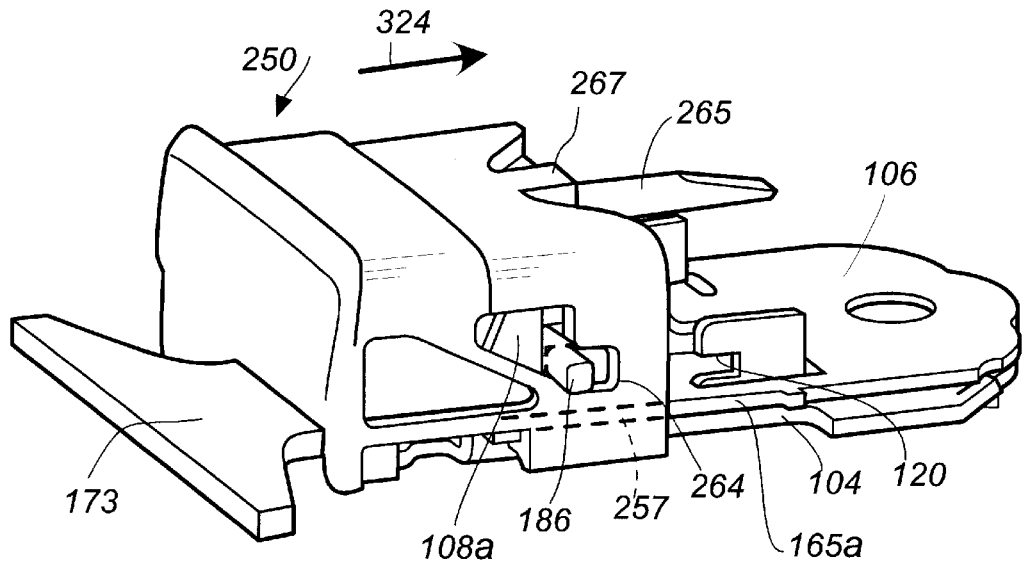
FIG. 3 is another isometric view showing the interrelationship of the buckle's button and latch plate. The latch plate is shown in its latched position with a tongue inserted within the buckle.

As mentioned, the button 250 is slidably received on the edges 165a,b of the upper frame part 106. The button 250 includes an end 252 which is depressed (by its user) to release the tongue 173 from the buckle 100, a top 254 and extending sides 256. As mentioned above, each side 256 of the button 250 includes an opposingly situated slot (or recess) 257 which permits the button to slide upon the corresponding extending sides 165a or 165b of the lower frame part 106. Each button side 256 includes an opening, slot or recess 258 therein, one portion of which is formed as a ramp 260 which engages a lower side 262 of a corresponding latch wing 186 and lifts same (as the button is depressed). A second portion of the slot (or recess) 258 is formed as a horizontal guide or blocker 264 (see FIG. 3) which when positioned over the wings or ends 186 of the latch plate 180 prevents the latch plate from lifting or being lifted out of the slots 126a and 126b in the lower and upper frame parts and tongue slot 175. The button also includes an integral pin 265 and boss 267. The pin is received in and axially guided by the semi-circular guide 308 in the spring housing 300.

Figure 2:
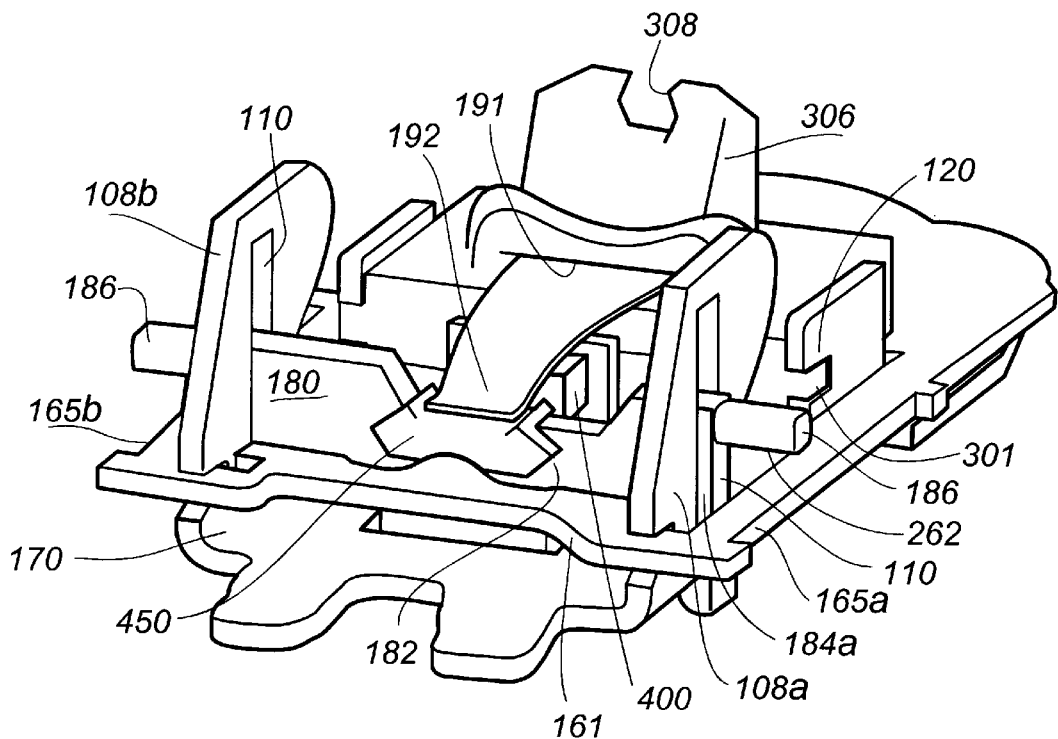
FIG. 2 is an isometric view showing two buckle frame parts assembled together as well as some of the components of the first embodiment.
Figure 4:
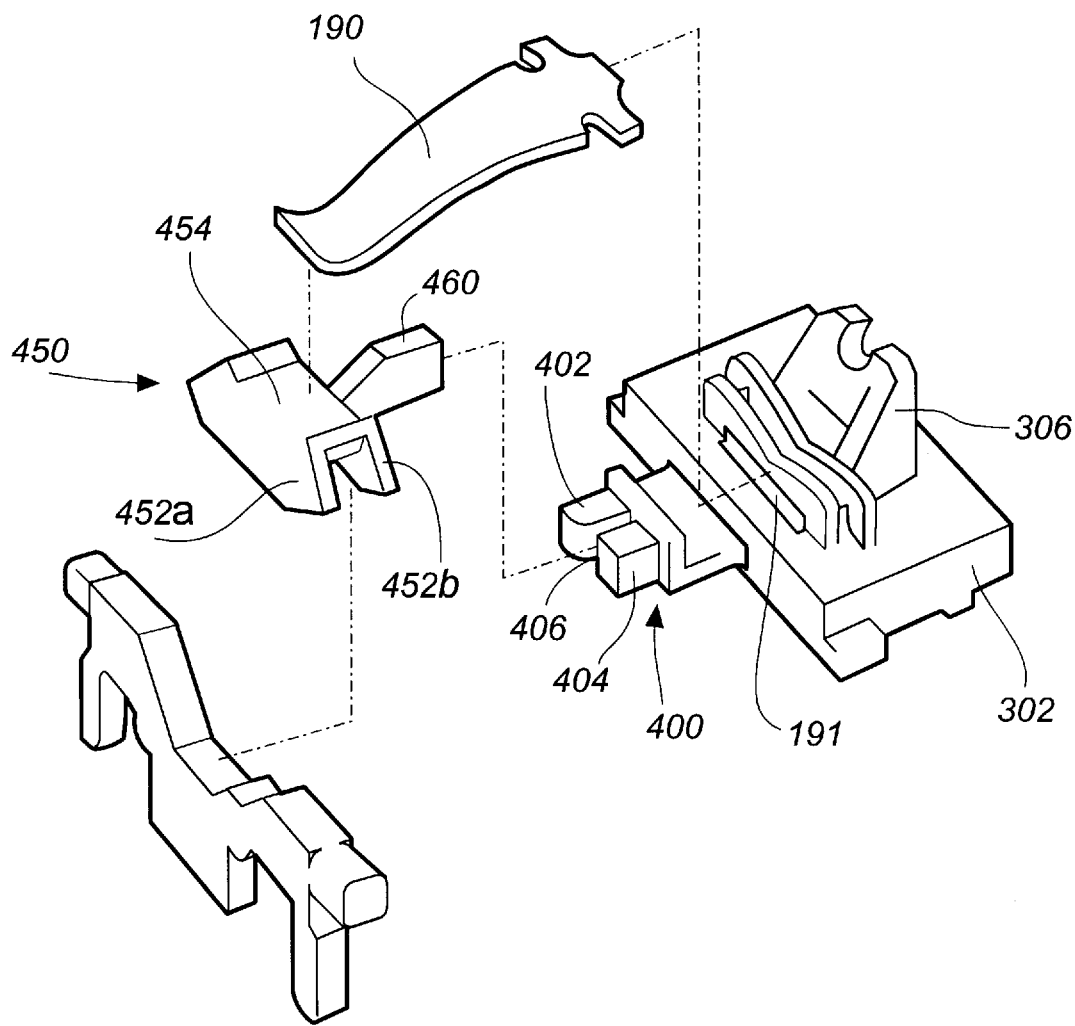
FIG. 4 is a partial assembly view of the first embodiment illustrating a spring/sensor housing, latch plate, clip member and leaf spring.

FIGS. 1, 2 and 4 show a first embodiment of the invention in which the sensor assembly 400 (comprising a Hall Effect sensor 402 and magnet 404 separated by a space 406) is insert molded to the front edge of the spring/sensor housing 300. A clip member 450 is positioned on the center portion 182 of the latch plate 180. The clip member 450 has opposing side portions 452a,b and a top 454. The clip member 450 is slid upon the center portion 182 of the latch plate 180 with the sides 452a,b about opposing sides of the center portion and the top 454 resting upon the top 188 of the center portion 182. A metal bar 460 extends from the clip member 250 and moves with the latch plate 180. The bar 460 may be formed by bending a portion of side 252b ninety degrees to form a projecting bar. In this case the clip member 450 is fabricated of metal such as steel or iron. Alternately, a steel or iron bar could be insert molded into a plastic body of a clip member 450. As illustrated in FIG. 2, the spring 190 is positioned upon the top 254 of the clip member to bias the clip member 450 into the latch plate 180 and to also bias the latch plate towards its latched position. When the latch plate is in its unlatched position, the bar 460 is positioned away from the sensor assembly 400. After the tongue is inserted into the buckle the latch plate will drop to its latched position. In this position the bar 460 of the clip member will be positioned within the space 406 between the sensor 402 and the magnet 404 to assist in generating a signal indicating that the latch plate has moved to its latched position within the tongue opening 175. As can be appreciated, the sensor 402 provides a measurement of the change in magnetic flux to indicate that the bar 460 has been inserted therein or removed therefrom. The bar 460 can be positioned so that when latch plate is in its unlatched position the bar 460 is within the space 406 and when the latch plate 180 drops to its latched position the bar 460 moves away from the sensor assembly.

Figure 5:
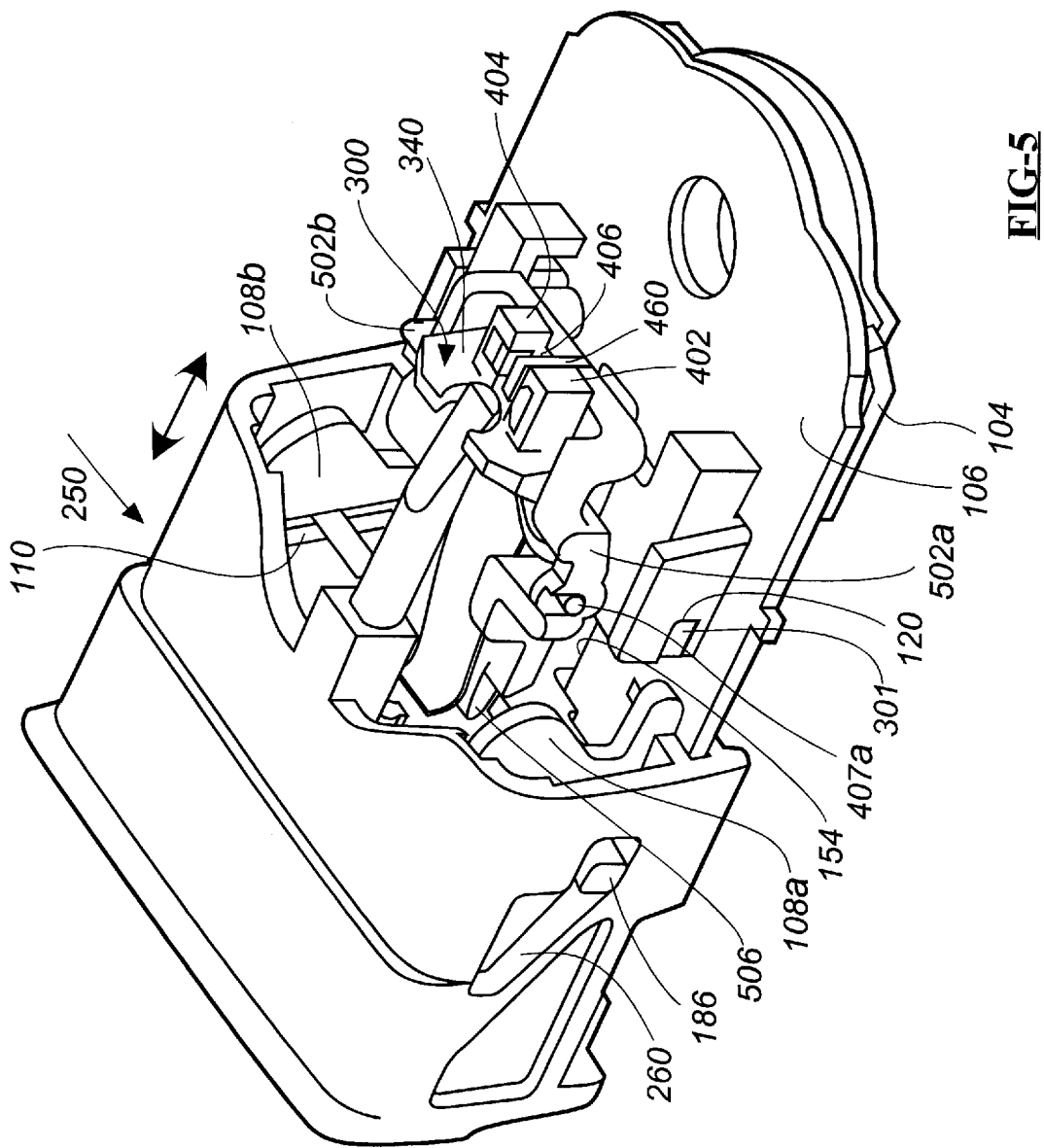
FIG. 5 is an isometric view showing the major components of a second embodiment of the invention.
Figure 6:
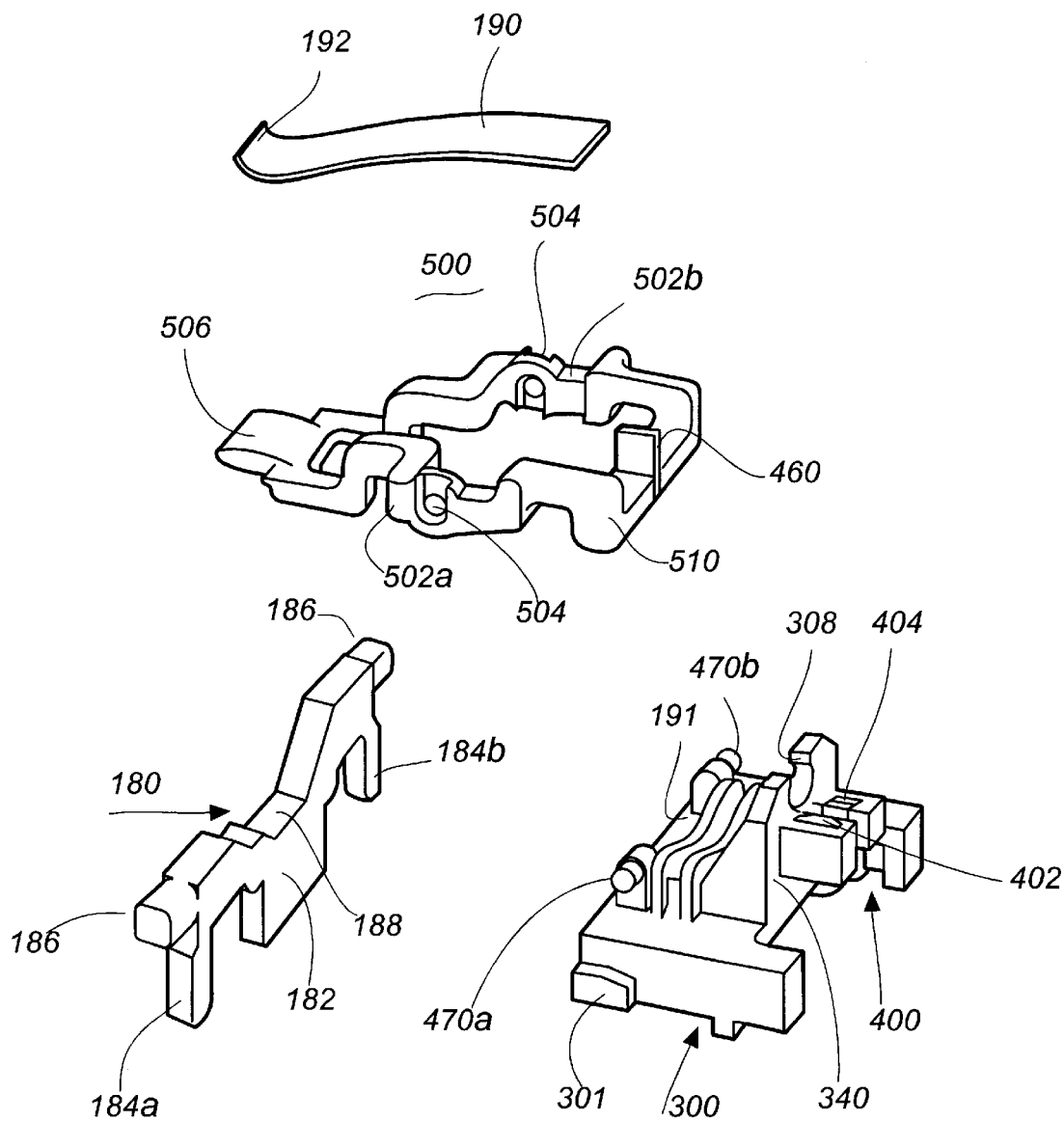
FIG. 6 is a partial assembly view of the major components of the second embodiment showing a latch plate, pivoted member, spring/sensor housing and leaf spring.

Reference is made to FIGS. 1 as well as 5 and 6. FIGS. 5 and 6 show an alternate embodiment of the invention. The basic portions of the buckle 100 such as the frame, button and ejector, are used without changes change in this embodiment. In this embodiment, the spring/sensor assembly 400 is positioned and extends from the rear 340 wall of the spring housing 300. The sensor 402 and magnet 404 can preferably be insert molded into the body 302 of the housing 300. The housing 300 additionally includes two oppositely extending axles or pivots 470a,b which extend outwardly from the body 302. Rotationally supported on the housing 300 is a pivot member 500. The pivot member 500 includes parallel legs (or sides) 502a,b that are pivoted on the axles 470a,b. More particularly, the legs each include an opening 504 to receive a respective axle 470a or 470b. It should be appreciated that the openings 504 can be formed in the housing 300 and the axles formed in the legs 502a,b. The pivot member 500 includes a tip portion 506 which extends from the legs 502a,b and rests upon the center portion 182 of the latch plate 180 and a rear portion 510 which is located below the sensor 402 and magnet 404. The rear portion 510 includes a metal bar 460 (inserted therein) extending upwardly therefrom. With the latch plate 180 in its unlatched or up position, the rear portion 510 is moved downwardly so that the bar 460 is remote from the sensor assembly 400 (not shown). When the latch plate 180 is shifted to its latched position it and the tip portion 508 (of the pivot member 500) are moved downwardly by the spring 190. This motion pivots the member 500 and lifts the bar 460 into the space 406 between the sensor 402 and the magnet 404 changing the magnetic field therebetween permitting a signal to be generated.

Figure 7:
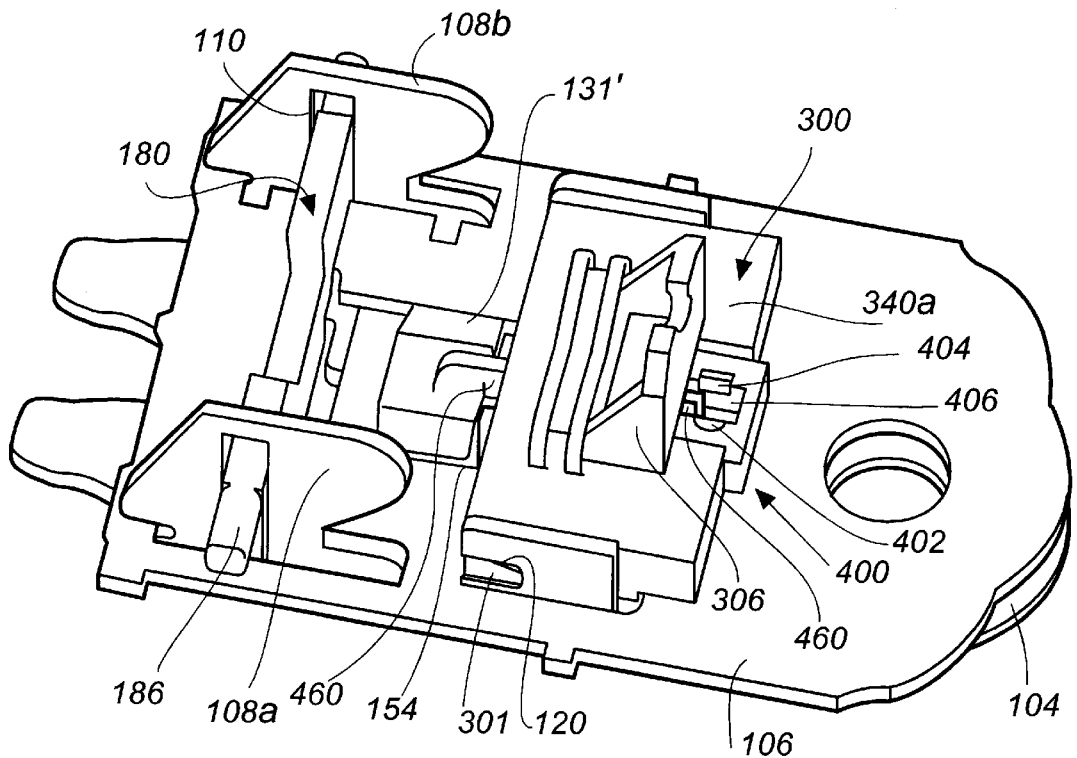
FIG. 7 is a partial isometric view of a third embodiment of the invention.
Figure 8:
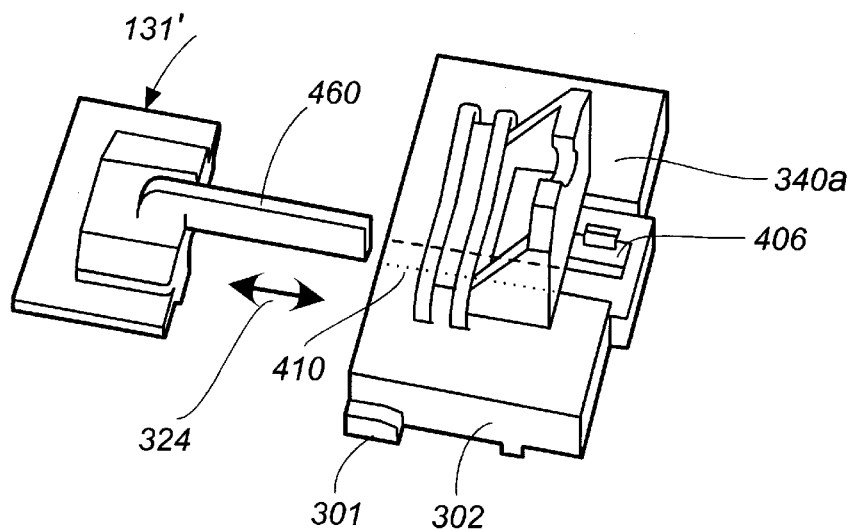
FIG. 8 is a partial assembly showing the relationship between a modified ejector and spring/sensor housing.

Reference is made to FIGS. 7 and 8 which illustrate another embodiment of the buckle 100 and an alternate placement of the sensor assembly 400. It should be appreciated that the leaf spring 190 has been removed for clarity which would as before extend from housing 300 to the latch plate 180. In this embodiment the sensor assembly 400, comprising a Hall Effect sensor 402 and spaced magnet 404, is molded into the rear end 340a of the body 302 of the spring housing 300. The sensor 402 and magnet are again spaced from one another by space 406. The spring housing 300 is fabricated with a passage 410 which extends through to the space 406 between the sensor 402 and the magnet 404. The ejector 131' is slightly different from the ejector 131 used above in that it supports the metal bar 460 which extends therefrom. The bar 460 may be insert molded to the body of the ejector. When the tongue 173 is inserted into the buckle, the ejector 131' is moved rearwardly (as illustrated in FIG. 7). This motion positions the bar 420 between the sensor 402 and the magnet 404 changing the magnetic field therebetween. This change in the magnetic field, as sensed by the Hall Effect sensor 402, is used to generate a signal indicative of the fact that the tongue has been inserted within the buckle and that the latch plate 180 has moved into its latched position.

To unbuckle the seat belt, the button 250 is moved in the direction of arrow 324 (rightward). During this motion the sloping ramps 260 on the button contact latch ends 186 and raise the latch plate 180. Thereafter, the ejector 131 (or 131') ejects the tongue from the buckle 100 (see arrow 326).

Many changes and modifications in the above described embodiment of the invention can, of course, be carried out without departing from the scope thereof. Accordingly, that scope is intended to be limited only by the scope of the appended claims.

It is claimed:

1. A seat belt buckle (100) comprising:

a frame (102) having a tongue receiving opening (170) to receive a tongue (173) as the tongue is moved in a first direction, a latch member (180) arranged to move from a latched position to an unlatched position, an ejector (129) to eject the tongue when the latch member is in its unlatched position, an electronic sensor assembly (400) located upon the frame (102) comprising a magnetic sensor and a spaced magnet, a metal bar (460) supported on one of the latch member (180), the ejector (131) and a pivot member (500) and movable into position between the sensor and the magnet.

2. The device as defined in claim 1 wherein the metal bar (460) is clipped to the latch member.

3. The device as defined in claim 1 wherein the metal bar (460) is insert molded into a body (450) which is slipped onto the latch member.

4. The device as defined in claim 1 wherein the device includes a spring housing (300) attached to the frame and wherein the electronic sensor assembly (400), comprising the magnetic sensor and the spaced magnet, are part of the spring housing and extend outwardly therefrom and wherein the metal bar is insertable between the magnetic sensor and magnet.

5. The device as defined in claim 4 wherein the sensor housing (400) is located on the spring assembly (300) at a location remote from the latching member and wherein the device further includes a pivoted member (500) having a first portion (506), movable by the latch member and an opposite second portion (510), wherein the metal bar is located on the second portion and movable relative to the electronic sensor assembly (400) in response the pivoting of the pivoted member and movement of the latching member.

6. The device as defined in claim 1 wherein the magnet sensor is a hall effect sensor.

* * * * *